April 9, 1968     C. J. PIERCE, JR     3,376,850
APPLICATORS FOR MOLTEN THERMOPLASTIC ADHESIVE
Filed Feb. 20, 1967     3 Sheets-Sheet 1

INVENTOR.
Chester J. Pierce, Jr.
BY Howard G. Russell
his atty.

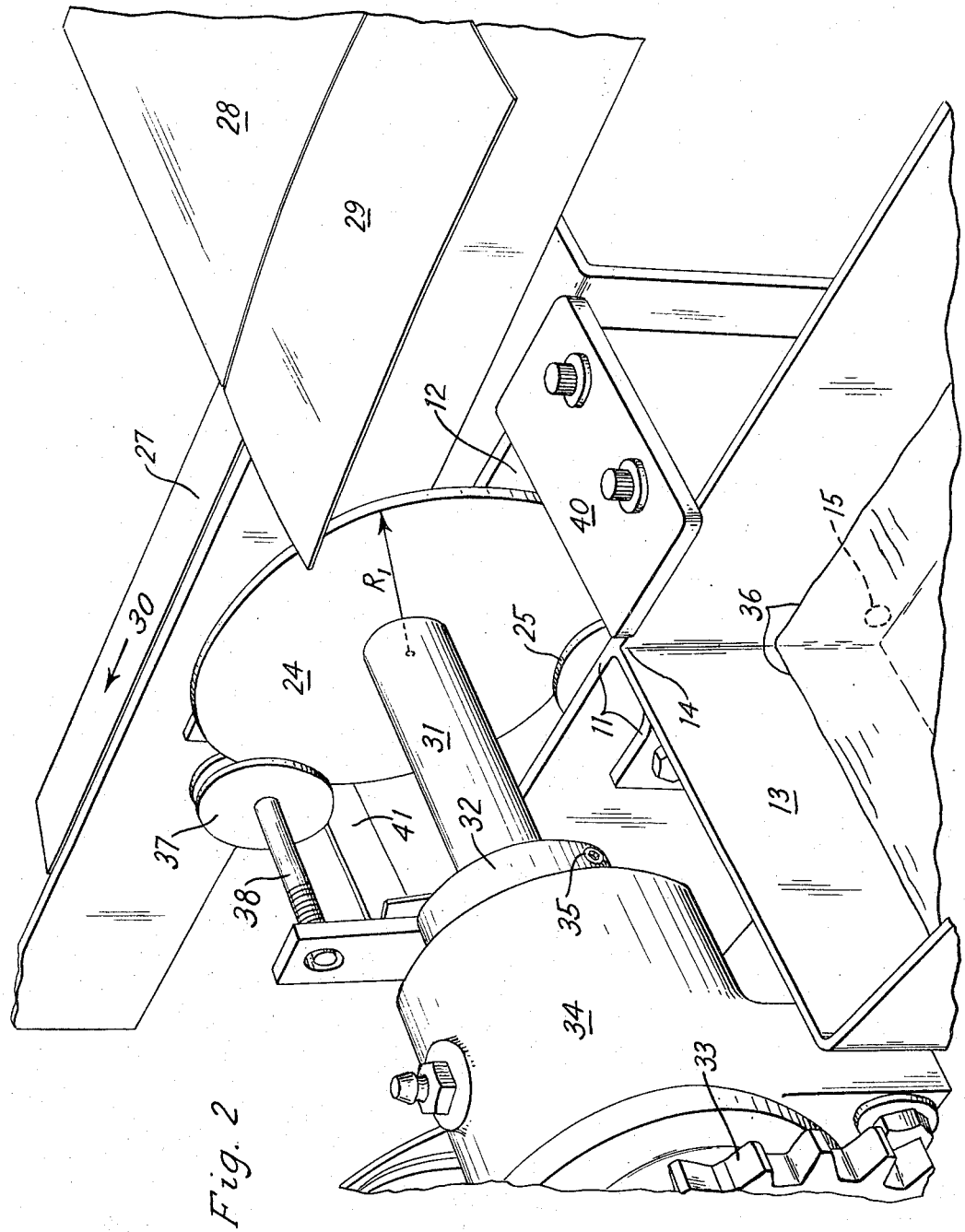

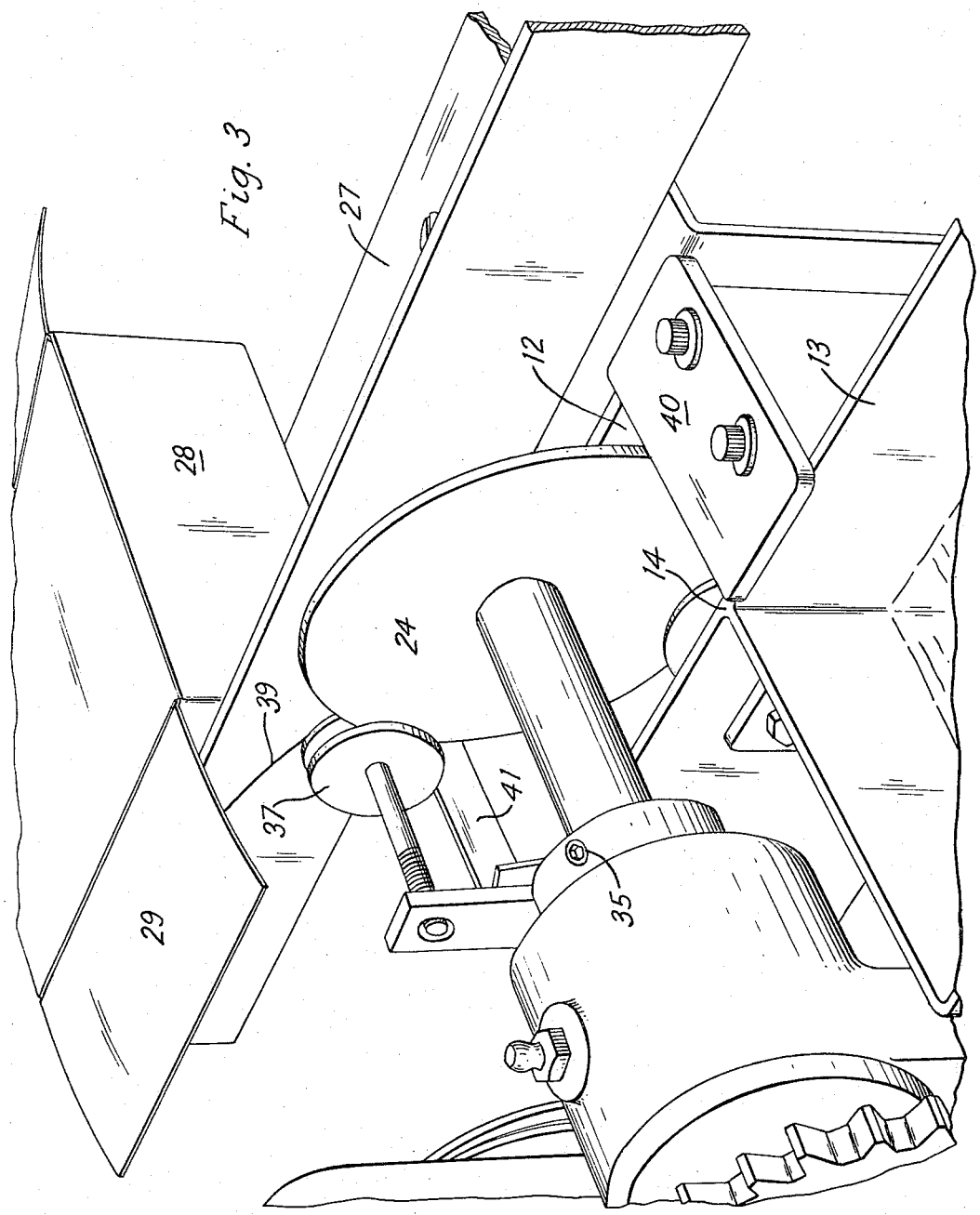

United States Patent Office 3,376,850
Patented Apr. 9, 1968

3,376,850
APPLICATORS FOR MOLTEN THERMO-
PLASTIC ADHESIVE
Chester J. Pierce, Jr., Palo Alto, Calif., assignor to
Kliklok Corporation, New York, N.Y., a corporation of Delaware
Filed Feb. 20, 1967, Ser. No. 617,401
5 Claims. (Cl. 118—202)

ABSTRACT OF THE DISCLOSURE

The present improvements bring about a reduction in the rate at which molten thermoplastic adhesives oxidize by providing two volumes of molten adhesive of which the larger one is maintained at a lower temperature than the smaller, and by maintaining the surface area of exposure of molten adhesive small in relation to its volume by the use of a deep chamber from the lower portion of which adhesive is supplied to an applicator wheel by a feeder wheel driven by viscous drag. A further similarly driven wheel collects strung-out threads of adhesive.

BACKGROUND OF THE INVENTION

1. Field of the invention

The use of molten thermoplastic adhesives in the setting up or sealing of folding boxes involves the problem of deterioration of the adhesive by oxidation.

The degree to which a given volume of molten thermoplastic adhesive oxidizes is proportional to its temperature and also proportional to the surface area of the adhesive which is exposed to air.

The effect of oxidation on the molten adhesive is discoloration, loss of more highly volatile constituents with the result of an inferior and/or more slowly setting bond, the formation of a coating on applicator parts which makes these parts difficult to clean, and also an increased tendency of the adhesive to string out as a rubbery thread.

2. Description of the prior art

The problem of oxidation has been attacked in the past by maintaining the volume of molten adhesive extremely small and melting only so much adhesive as is needed for immediate use. More particularly, it is known to supply solid adhesive in the form of a rod to a melting device at a linear rate proportional to the rate of consumption of molten adhesive. The known devices designed for this purpose are of considerable complexity.

It is also known to provide in a coating applicator for spun filaments two separate chambers. In the first chamber a thermoplastic coating material is melted at a relatively low temperature and flows into a second chamber where it is heated to a higher temperature for application to the filaments by means of an upper applicator roll and a lower feed roll feeding molten material from the pool of material within the applicator chamber to the applicator roll.

The known device requires a relatively complex hollow-walled housing construction in order to limit, by means of insulating material provided in the hollow walls, heat transfer from chamber to chamber.

SUMMARY OF THE INVENTION

A hot melt applicator comprising a housing providing two separate chambers, viz., a premelting chamber and an applicator chamber, both chambers being in communication through a passage extending therebetween and comprising heating means for heating the contents of the applicator chamber to a higher temperature than the contents of the premelting chamber, and comprising an applicator wheel extending into the applicator chamber for carrying molten adhesive from said last named chamber to a level above the top rim of the last named chamber is improved in that, according to the present invention, the two chambers are substantially rectangular in plan view and are diagonally offset so as to be joined along a common corner portion.

The two chambers are suitably formed within a one piece cast metal housing.

The construction of a hot melt applicator employing a feed wheel is simplified by driving the shaft of the applicator wheel directly, and by driving the feed wheel by viscous drag from the applicator wheel.

The applicator wheel may be a narrow disc and the feed wheel may have a peripheral groove formed therein into which a peripheral portion of the applicator wheel extends to drive the roller by viscous drag.

In the event a string-out collecting roller is employed, such roller being known per se, the roller is provided with a peripheral groove into which a peripheral portion of the applicator wheel extends to drive the roller by viscous drag.

The various objects, features and advantages of this invention will appear more fully from the detailed description which follows accompanied by drawings showing, for the purpose of illustration, a preferred embodiment of the invention. The invention also resides in certain new and original features of construction and combination of elements hereinafter set forth and claimed.

Although the characteristic features of this invention which are believed to be novel will be particularly pointed out in the claims appended hereto, the invention itself, its objects and advantages and the manner in which it may be carried out may be better understood by referring to the following description taken in connection with the accompanying drawings forming a part of it in which:

BRIEF DESCRIPTION OF THE DRAWINGS

FIG. 2 is a perspective view of a wheel-type applicator using the receptacle of FIG. 1, the view showing the approach of a folding box to which a strip or bead of adhesive is to be applied; and FIG. 3 is a perspective view of the applicator of FIG. 2 after passage of the carton past the applicator wheel and at the moment of removal from the carton of a thread of adhesive strung out from the trailing portion of strip or bead of applied adhesive.

In the following description and in the claims various details will be identified by specific names for convenience. The names, however, are intended to be generic in their application. Corresponding reference characters refer to corresponding parts in the several figures of the drawings.

Figure 1:
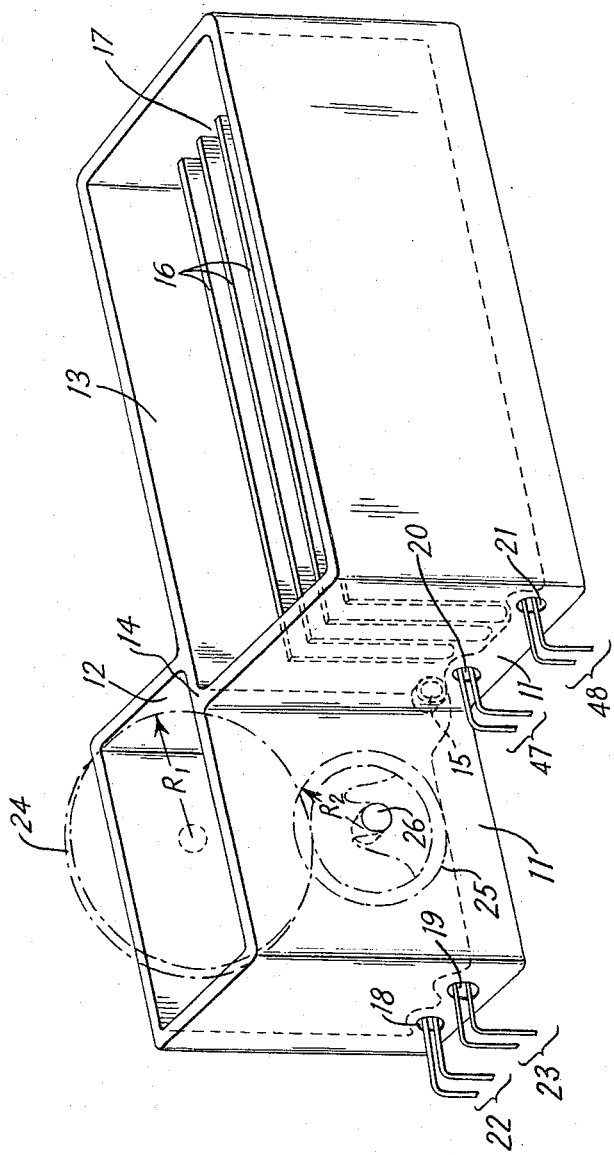
FIG. 1 is a perspective view of a two-chamber hot melt applicator receptacle embodying the present improvements.

The drawings accompanying, and forming part of, this specification disclose certain specific details of construction for the purpose of explanation of broader aspects of the invention, but it should be understood that structural details may be modified in various respects without departure from the principles of the invention and that the invention may be incorporated in other structural forms than shown.

DESCRIPTION OF A PREFERRED EMBODIMENT

FIG. 1 shows a receptacle housing 11 in which two chambers 12 and 13 are formed. The housing is preferably made of a metal having good heat conductivity, for example, an aluminum alloy.

The chambers 12 and 13 are of substantially rectangular bottom area and are diagonally offset, so as to have a wall corner portion 14 in common at which two corners of the chambers 12 and 13 meet. A passage 15 is provided which extends through the wall portion near the bottom of the chambers and permits liquid to flow from one chamber into the other.

The housing is conveniently produced by casting and preferably comprises metal fins 16 in the larger chamber. These fins extend into the chamber space from the bottom and preferably terminate short of the end walls, so as to leave a passage 17 for liquid around the ends of the fins so as not to trap volumes of liquid between pairs of fins.

The bottoms of the chambers are relatively thick and have bores extending into them from the outside, as are indicated at 18, 19, 20 and 21, passages 20 and 21 being optional.

The bore 18 houses an electric heating element of the resistance type from which leads 22 extend to a suitable source of electric power controlled by a thermostatic temperature sensor installed in the bore 19. Two leads 23 extend from the temperature sensor.

The heat developed by the electric heating element heats the walls of the chamber 12 and maintains molten thermoplastic adhesive contained therein to the proper temperature for application by an applicator wheel or disc 24 indicated in dash-dot lines. Beneath the applicator wheel there is indicated a feed wheel 25 which freely turns on a spindle 26 supported in the housing interior.

The purpose of, and details regarding, the wheels 24 and 25 will be described further below in connection with FIGS. 2 and 3.

The heat generated by the heating element in the bore 18 travels through the walls of the housing by conduction and consequently heats the walls of the chamber 13, the fins 16, and thermoplastic adhesive in the chamber 13, but to a lower temperature which is preferably so selected as to be just sufficient to melt solid adhesive put into the chamber. This molten adhesive then flows into the chamber 12 through the passage 15 at the rate at which adhesive is being consumed and is heated within the chamber 12 to the relatively high temperature of application.

It will be noted that the chamber 12 is relatively deep, considerably deeper than the radius $R_1$ of the applicator wheel 24, which by itself would be incapable of scooping up or withdrawing molten adhesive if the liquid level were to drop to a point below the lowest portion of its periphery.

The feed wheel 25, however, whose periphery extends very closely to the bottom of the chamber 12 becomes coated with adhesive and transfers adhesive to the applicator wheel.

It is thus possible to use up practically all of the molten adhesive in the chamber 12 in spite of its considerable depth.

The depth of the chamber 12 is made great in order to give the chamber (and also the chamber 13) a large volumetric capacity in relation to the surface area of the liquid contained therein.

Compared with melt-pot type applicators of conventional construction, the illustrated housing has several times the capacity of a conventional relatively shallow housing, yet the illustrated housing exposes a smaller area of molten adhesive to air in relation to its volumetric capacity.

In the event the conduction of heat from the heater in the bore 18 to the walls and fins 16 of the chamber 13 is insufficient for the volume of the chamber, more particularly in the event the melt-down rate of the chamber 13 is insufficient to keep pace with the consumption of adhesive from chamber 12, a supplementary heater is employed which is housed in the bore 20 associated with a thermostatic temperature sensor for its control, the sensor being installed in the bore 21.

The latter sensor is set to maintain a lower temperature than the sensor in the bore 19. The leads of the supplementary heater are seen at 47 and the leads of the associated temperature sensor are shown at 48.

Referring to FIG. 2, a box track 27 is shown on which a box 28 is moved in the direction of the arrow 30. The box 28 comprises a flap 29 which is about to move into contact with the adhesive-coated periphery of the applicator wheel 24 which then applies a strip or bead of adhesive to the underside of the flap 29 prior to folding of the flap 29 into contact with the sides of the box. The folding procedure is not illustrated.

The applicator wheel 24 is fixed on a shaft 31 and the shaft 31 is clamped inside a sleeve 32 driven by gears 33. The sleeve is mounted for rotation in a bearing 34 and comprises one or several set screws 35 permitting the wheel's distance from the bearing to be adjusted so as to be able to apply adhesive to the flap 29 at different distances from its outer edge.

The level 36 of the adhesive is shown to be quite low, so low that the feed wheel 25 in chamber 12 is exposed.

The feed wheel 25 is considerably thicker than the applicator wheel 24 and has a peripheral groove machined into it which is slightly wider than the width of the applicator wheel 24 extending into the groove. This groove gives the feed wheel 25 an H-shape, if viewed edge-on.

If the chambers 12 and 13 were empty of liquid, the driven applicator wheel 24 would fail to drive the feed wheel 25 because of the respective peripheral clearances. The clearance gaps, however, are filled with highly viscous liquid causing the applicator wheel 24 to drive the feed wheel 25 by viscous drag. The feed wheel in turn picks up adhesive from a low level and transfers it to the applicator wheel.

This arrangement makes it possible to employ a relatively deep chamber with a resultant relatively small area of exposure of the contained adhesive to the atmospheric air.

The feed wheel transfers adhesive not only to the periphery of the applicator wheel, but also to its sides. This is taken advantage of for the purpose of driving, in a similar manner, a further wheel or roller 37 freely rotatable on a shaft 38.

The roller 37 serves to collect and wind up the thread 39 (FIG. 3) of adhesive which is strung out between the end of the applied bead of adhesive of the flap and the applicator wheel when the trailing edge of the flap moves away from the applicator wheel.

The provision of string-out collecting rollers is known per se, but as far as I am aware the known rollers are gear driven, which complicates the construction of the adhesive applicator and also presents cleaning problems when adhesive seeps into the space between the gears where it oxidizes and carbonizes. Cleaning of the viscous drag driven roller 37 presents no difficulty.

The roller 37 resembles the feed wheel 25 in shape and is substantially H-shaped if viewed edge-on. It idles on the shaft 38 thus following axial adjustments of the applicator wheel.

A scraper blade 40 controls the thickness of the adhesive film on the periphery of the wheel 24 and a further scraper blade 41 removes adhesive collecting on the roller 37.

What is claimed is:
1. A hot melt adhesive applicator comprising a housing providing two separate chambers, viz., a premelting chamber and an applicator chamber, both chambers being in communication through a passage extending therebetween; heating means for heating the contents of the applicator chamber to a higher temperature than the contents of the premelting chamber; and an applicator wheel extending into the applicator chamber for carrying molten adhesive from said last named chamber to a level above the top rim of the last named chamber, characterized in that the two chambers are substantially rectangular in plan view and are diagonally offset so as to be joined along a common corner portion.

2. A hot melt adhesive applicator according to claim 1 in which the two chambers are formed within a one piece cast metal housing.

3. A hot melt adhesive applicator according to claim 1, in which the shaft of the applicator wheel is located above the liquid level and in which a feed wheel is provided below the applicator wheel and is in frictional contact therewith, characterized in that the said shaft is driven directly and that the feed wheel is driven by viscous drag of the applicator wheel.

4. A hot melt adhesive applicator according to claim 1, characterized in that the applicator wheel is a narrow disc and that the feed wheel has a peripheral groove into which a peripheral portion of the applicator wheel extends.

5. A hot melt adhesive applicator according to claim 4 comprising a string-out collecting roller, characterized in that the said roller has a peripheral groove into which a peripheral portion of the applicator wheel extends to drive the roller by viscous drag.

References Cited

UNITED STATES PATENTS

| | | | |
|---|---|---|---|
| 2,693,429 | 11/1954 | Radtke et al. | 118—202 X |
| 2,787,241 | 4/1957 | Kelley | 118—202 X |
| 3,030,915 | 4/1962 | Shannon | 118—202 |

CHARLES A. WILLMUTH, *Primary Examiner.*

R. I. SMITH, *Assistant Examiner.*